Sept. 3, 1963  R. A. F. DIVERS  3,102,304
INJECTION MOULDING MACHINE
Filed Jan. 13, 1960  5 Sheets-Sheet 5

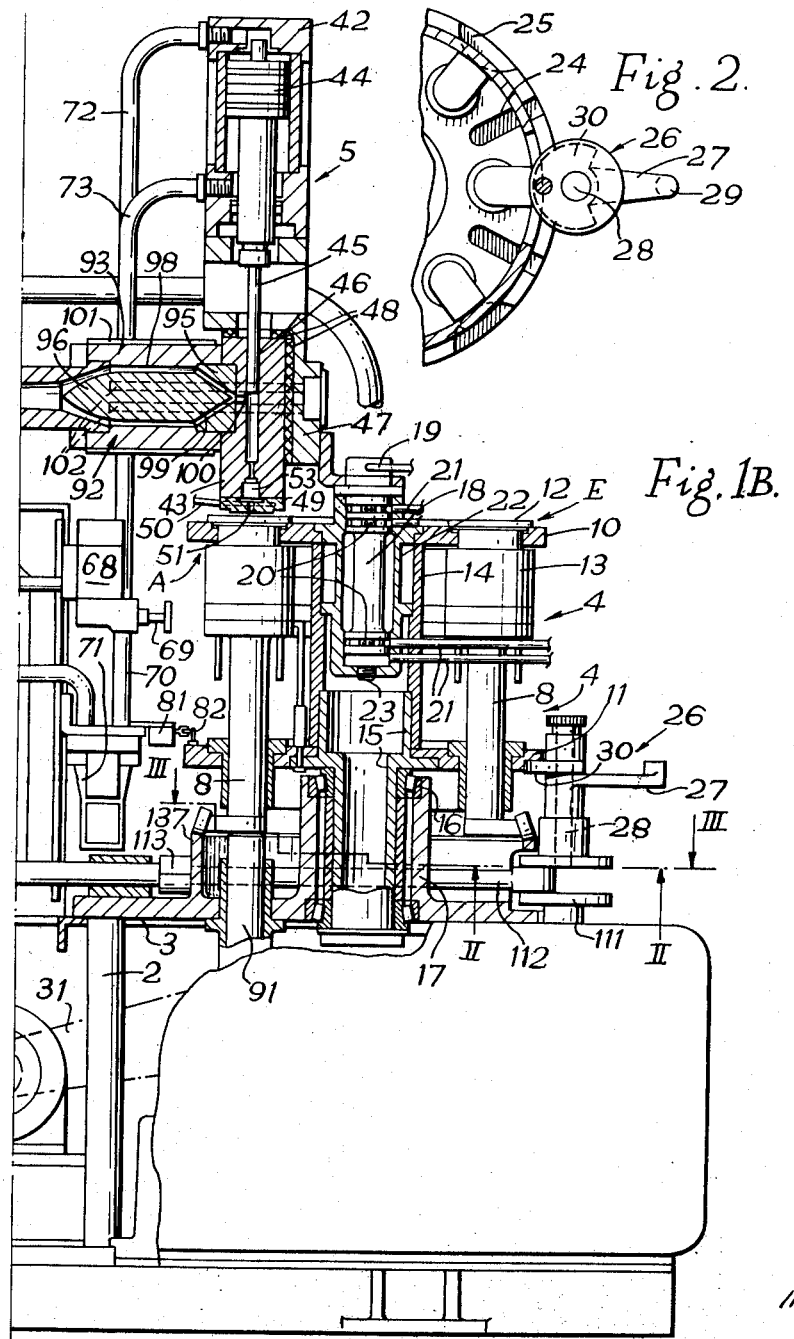

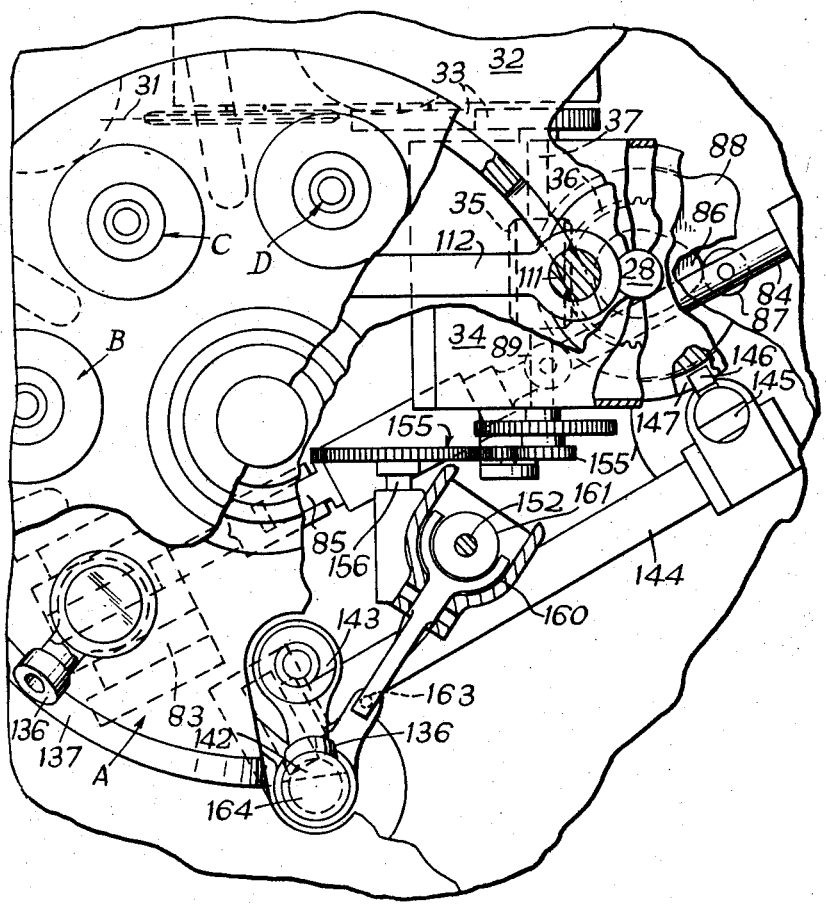

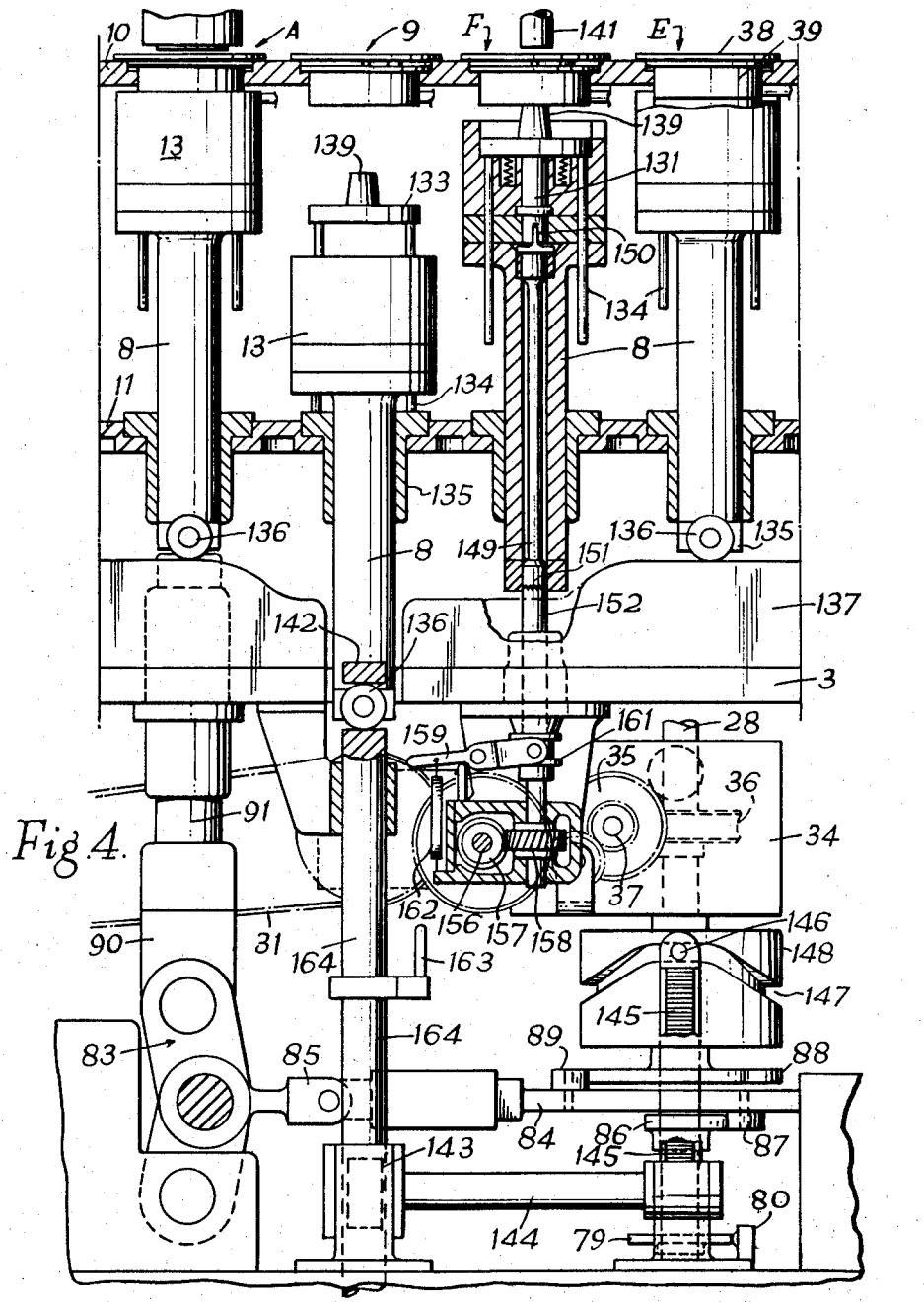

INVENTOR
REGINALD ALBERT FOORD DIVERS
BY
Larson and Taylor
ATTORNEY

United States Patent Office 3,102,304
Patented Sept. 3, 1963

3,102,304
INJECTION MOULDING MACHINE
Reginald Albert Foord Divers, Dartford, England, assignor to Herbert Morris Limited, Empress Works, Loughborough, England
Filed Jan. 13, 1960, Ser. No. 2,156
Claims priority, application Great Britain Jan. 19, 1959
3 Claims. (Cl. 18—20)

This invention is concerned with injection moulding machines of the turret type, i.e. those which comprise, inter alia, a rotatable table or bolster (hereinafter referred to simply as a "bolster") carrying a ring of moulds, and a head at a fixed station for injecting plastic into each of the moulds as they are brought in turn into a position below this head by an indexed rotary movement of the bolster. In such a machine, each mould is in at least two parts which have to be separated when the moulded article or articles (the latter in the case of a multiple mould) has hardened, to allow the article(s) to be removed.

It is an aim of this invention to furnish a fully automatic machine of this type (i.e. one which is devised so as to put out finished moulded articles in quantity production without human intervention or handling at any stage), and one with a high rate of such output. The machine actually established in fulfilment of these aims, and described below, embodies other attributes, such as a robust construction and controls, economical running, saving and automatic re-use of scrap plastic without pre-granulation, the facility for injecting only a selected number of moulds less than the full complement and the selection of the number and positions of these moulds, amongst other advantageous features. These will be referred to below at appropriate places.

Broadly stated, the turret machine presented by the present invention comprises a bolster-indexing mechanism, an assembly for feeding plastic to the injection head, means for locking the moulds at the injection station, and means for injection of plastic from said head into a mould at the injection station, all operable in timed relationship under the control of a common, single camshaft.

Further, in an injection moulding machine according to this invention, the operation of the bolster-indexing mechanism, the feed of a controlled amount of pre-plasticised plastic to the injection head, for each injection shot, the locking of each mould in turn at the injection station, and the removal of moulded articles from the moulds at a mould-stripping station, are all carried out in timed relationship with one another under the control of a common camshaft.

A very compact and effective machine arrangement has been devised in which the camshaft is disposed vertically adjacent the bolster and is equipped with individual cams or equivalent to mechanically operate the feed assembly and thereby feed a controlled quantity of plastic through a pre-plasticiser unit to an injection chamber in the injection head, to trigger the injection stroke of an injection plunger in said chamber, to mechanically operate the means for locking the mould at the injection station, for separating the moulded article(s) from the opened mould at a mould stripping station, and for engaging and driving said bolster through the indexing mechanism.

This camshaft can be driven by a small horsepower motor, thus reducing the expense of the machine and its running costs. The use of the cam drive, moreover, secures a flexibility in setting and maintenance.

A further and important adjunct of the machine according to this invention is means controlled from said common camshaft to produce relative rotation between the moulded article and a moulding core in a mould at a station in the travel of said mould. This expedient is particularly useful in enabling moulded articles which cannot readily be removed from a moulding core, for example where moulded with screw threading, to be disengaged so that they can quickly be removed from a mould, for example by means of a simple air blow. As has been indicated, the single camshaft can be used to dictate the required relative rotation, and means eminently suitable for this purpose are described below.

Again the bolster-indexing mechanism can now be effectively operated by the camshaft referred to. This bolster-indexing mechanism may comprise a Geneva motion with an indexing arm which is rotatably carried directly by said common camshaft and be arranged to engage with successive radial slots in the bolster to turn the latter stepwise. With the vertical camshaft arrangement, the indexing arm can turn in a horizontal plane at the level of the bolster, this requiring less power to index the comparatively heavy installation represented by the bolster and its moulds. The Geneva mechanism advantageously incorporates a locking lobe which engages a corresponding recess in the turning bolster to ensure correct angular indexing thereof.

The opening of the moulds, at a station or stations remote from the injection station, is preferably performed by a mechanical system in automatic response to indexing of the bolster itself. In accomplishment of this system, the moulds are preferably supported from their undersides, during the rotary travel thereof, on a fixed trackway beneath the bolster, this trackway being stepped along part of its length to cause a lower part of each mould in turn to be lowered, and the mould thus opened, at a mould-opening station away from the injection station.

Again the moulds themselves may be designed so that the sprue can be separated from the moulded articles automatically and in various ways. In one of these, the upper part of the mould is itself made up of two components which have registering tapered gate channels and which are supported on the bolster but are capable of a limited relative axial movement when the lower mould part descends, thereby to break off the sprue from the moulded article(s). In the case of a multiple mould, sprue with radiating "gates" can be stripped by a special ejector pin.

In any of these events, the machine incorporates an added advantageous feature by which the stripped sprue is returned to the feed assembly by a compressed air blow, for example through a pipe at the mould opening station. The air blow for this purpose could be triggered automatically, for example by the use of a further cam on the camshaft operating and controlling an air valve at the required time.

The trackway referred to may, moreover, be gapped at a stripping station following said mould opening station, and a pull-down device is provided at this stripping station and is operable through a rack mechanism from a cam drum on said cam shaft to draw down the lower part of the mould at this station and so cause ejection of the moulded article(s) in this mould. These ejected articles may similarly be forwarded by compressed air to a suitable collector, or removed in any other convenient fashion.

Reference was made above to the use of means to produce relative rotation between the moulded article and a mould core, and in an advantageous embodiment, these means comprise a permanently-driven rotary spindle at said mould-opening station which is axially movable, in response to the descent of the preceding mould, to engage a mandrel, associated with the mould, for the purpose of rotating the mould core.

Moreover, by reason of the vertical disposition of the camshaft referred to above, a cam on this shaft dedicated to the mould locking can be arranged to produce a horizontal thrust at required times to a vertically-extensible toggle linkage so as to straighten the latter and apply pressure to the lower part of the mould then at the injection station.

The plastic feed assembly, in an advantageous arrangement, includes a stuffing plunger which is reciprocable from a crank on said camshaft to forward a predetermined quantity of plastic from a supply source for every rotation of this shaft.

Conveniently, and to provide for ready control of the quantity injected per shot from the injection head, the plastic is transferred from a supply hopper into the path of said stuffing plunger by a metering pusher of adjustable stroke which is mechanically coupled to, and reciprocable in unison with, the stuffing plunger.

This stuffing plunger will conveniently be reciprocable from said crank on the camshaft through a mechanical transmission which includes a yieldable hydraulic coupling which is adapted, if the feed is seriously obstructed for any reason, to collapse and thus prevent damage to, or impairment of subsequent operation of, the machine.

In a preferred form, the machine incorporates a pre-plasticiser unit incorporating advantageous features whereby a controlled quantity only of plastic is fed to the injection head at required times, and this material is supplied to the injection bore and maintained in a homogeneous plastic condition right until the actual moment of injection, thereby assuring a constant and proper size and quality of individual shots. This pre-plasticiser unit is disposed between the feed assembly and the injection bore in the injection head with its flow axis at right angles to this bore and opening directly into the latter. In addition it contains a heated core which ensures that the plastic is received in the hot fluent condition in the bore.

This core is advantageously a torpedo which, by virtue of the horizontal disposition, can have heating elements passing longitudinally through it and thus over a substantial proportion of its total length. This, in conjunction with the usual external heating elements around the pre-plasticiser unit, further favours the maintenance of the plastic at all times in optimum condition at the point of injection. Further, the horizontal arrangement of the internal heaters has been exploited to allow their ready insertion in, or removal from, the torpedo.

Conveniently the injection head comprises an injection plunger operable by a hydraulic piston/cylinder unit which is supplied by a pump through a reversing valve under the control of a cam on the common camshaft.

Thus, the reversing valve may be solenoid operated, with a switch in the supply circuit which is controlled by another timing cam on the camshaft. In addition, this solenoid circuit may include a safety switch which is adapted to be opened by mechanical abutment by an element on the bolster signalling the absence of a mould. In this way it is ensured that there is no injection if no mould is present at the moulding location then present beneath the injection head, a feature which allows for the advantageous use of the machine with a limited number of moulds only if prevailing orders may demand this at the time, or if the mould has been removed for repair or is under replacement.

The injection head is preferably heat insulated from its mounting and has a cooled nozzle piece at its lower end, thereby to hasten the setting of the injected material in the mould. This nozzle piece may be cooled from a cooling system which also serves the rotating moulds.

Further, in an advantageous arrangement, the injection head has a nipple which enters with an all round clearance into an injection recess in the aforesaid injection piece, for a purpose which will be described in more detail below in reference to a specific embodiment thereof.

A rotary injection moulding machine constructed in accordance with the present invention is illustrated by way of example in the accompanying drawings, in which:

FIGURE 2 is a detail taken on the line II—II of FIGURE 1 and seen in the direction of the corresponding arrows.

FIGURE 3 is an enlarged plan view of the lower right hand part of the machine, partly in section on the line III—III of FIGURE 1.

FIGURE 4 is a part sectional, developed, elevational view of part of the rotary moulding mechanism.

Figure 1A:
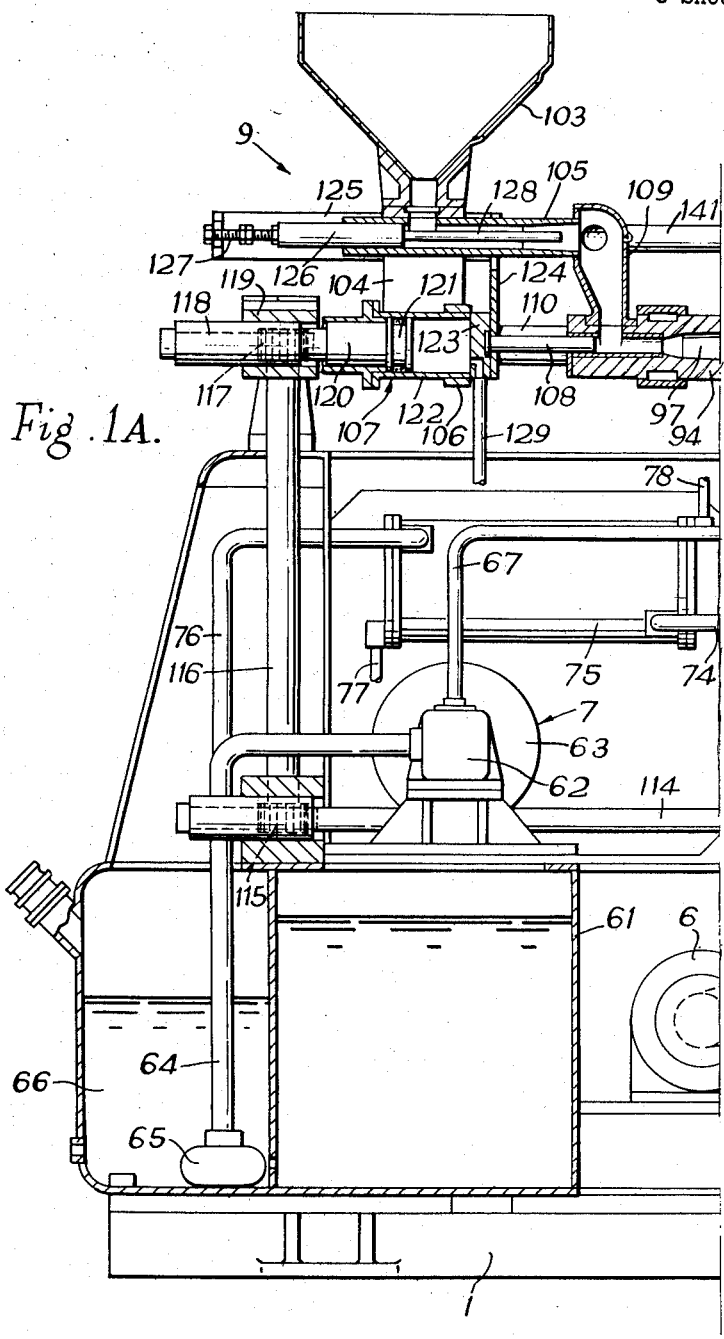
FIGURE 1 is an elevational view of this machine, partly in vertical section.

The machine shown is mounted on a common bedplate 1 having, upstanding from one end part thereof, columns 2 serving to support a platform 3 carrying a rotatable bolster 4. Also mounted on this bedplate are a driving motor 6, and hydraulic equipment 7 for operating the injection means. Uprights (for convenience not shown) on the bedplate 1 also support an injection head 5 and plastic feed assembly 9.

*Rotatable Bolster*

The rotatable bolster comprises a pair of vertically spaced circular plates 10 and 11 each furnished with a ring of apertures which, in the case of the upper plate 10, receive and support the upper parts 12 of the moulds and, in the case of the lower plate 11, allow the passage of thrust plungers 8 carrying the respective lower mould parts 13. The upper and lower bolster plates are welded to, or integral with, a connecting sleeve 14 and are supported by a tubular spigot 15 attached to and depends centrally from the lower bolster plate. This spigot is rotatable in a bearing race 16 in a hollow boss 17 upstanding from the platform 3.

The connecting sleeve 14 accommodates means for distributing cooling water to the moulds, and for this purpose has secured therein, at its upper end, a central sleeve 22 which surrounds a stationary water-distributing spool 18 fixed to the injection head 5. The hollow interior of this spool is connected to a water supply pipe 19 and communicates with annular channels 20 at the exterior of the spool cooperating with piping 21 leading to the individual moulds and turning with the bolster. A drain plug 23 in the bottom of sleeve 22 allows for collection of excess cooling water.

The lower bolster plate 11 is radially slotted at angular intervals at 24 (see FIGURE 2) corresponding to the number of mould openings in the plate (i.e. the number of stations at which the bolster is to stop in its intermittent rotation), and is provided with a part-circular recess 25 at its periphery intermediate each pair of successive slots. The function of the slots is to enable the bolster to be intermittently rotated by a Geneva mechanism 26, comprising a driving arm 27 which is carried by a main vertical shaft 28 adjacent the periphery of the bolster and has, at its outer end, a roller 29 which is arranged to engage in the successive slots 24 to index the bolster.

The main shaft 28 is vertically disposed and extends down to the bedplate of the machine. It represents a common driving shaft to operate or control practically all the movements of the machine, as will be described below. It is continuously driven (see FIGURES 3 and 4) from the main driving motor 6 through a chain 31, a change speed gear box 32, gear wheels 33 driven from the gearing in this box, and a reduction gear box 34 in which a shaft 37 drives a worm 35 meshing with a worm wheel 36 keyed to shaft 28.

The Geneva mechanism further includes a segmental lobe 30 which is also secured on shaft 28 and is of a radius equivalent to that of the recesses 25 in the lower bolster plate. This lobe slides and fits into the successive recesses 25 as the bolster plate rotates, and its function is to bring the moulds into correct position at each indexing of the bolster.

In this particular instance, the bolster plates have apertures for the accommodation of some seven mould sets, and there are therefore seven stations in one complete rotation of the bolster. The first of these, indicated A in the drawings, in the injection station at which the mould is locked under high pressure, followed by stations B, C, D and E, at which the mould remains closed under spring pressure (see below) and the moulded article is allowed to cool and set, a station F, where the mould is opened to a limited extent and an unscrewing mechanism may be applied as will be described below, and a final and stripping station G where the mould is fully opened and the moulded article ejected or withdrawn; the mould concerned then returns to station A and a resumption of the cycle.

*Injection Head and Operating Means*

The injection head 5 is mounted over the bolster at the injection station A, and comprises a single-acting hydraulic piston/cylinder unit 42 surmounting an injection block 43. The piston 44 of the hydraulic unit 42 has a depending plunger 45 slidable in an axial bore 46 in the block 43 terminating in an injection chamber 53. The unit 42 and the block 43 are carried by the member 47 of a common frame connected to the aforementioned upright (not shown), the block 43 being insulated from frame member 47 by heat insulating packing 48.

At its lower end the injection block 43 has a nozzle piece 49 equipped with cooling channels supplied through a conduit 50 from an outside source and having an injection orifice 51 for registration with the injection opening in the mould at the required time.

Figure 7:
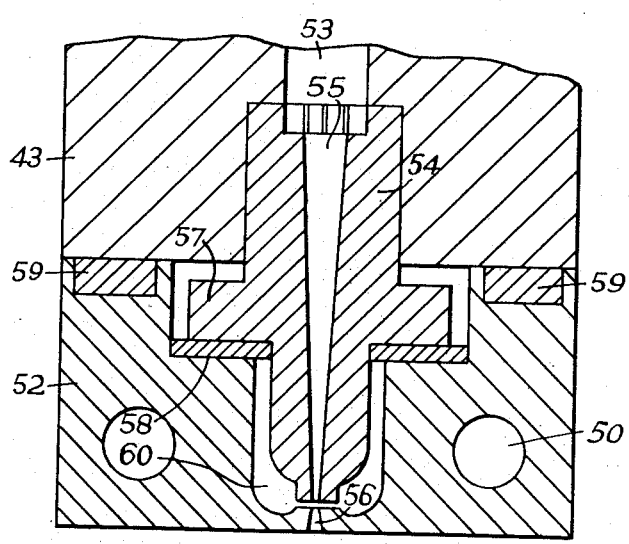
FIGURE 7 illustrates a modification of the injection nozzle in the machine.

In an alternative arrangement, illustrated in FIGURE 7 of the accompanying drawings, the aforesaid nozzle piece, here designated 52, instead of being simply connected to the bore 53 in the injector block 43, is formed to receive, with a small clearance, a nipple 54 made of a metal of good heat conductivity, e.g. brass. This nipple 54 is provided with a tapered bore 55 communicating with the plastic injection bore 53, and in register at the tip of the nipple with a small orifice 56 in the injection piece 52. At the part where the nipple enters the element 52, it is provided with a flange 57 and a layer 58 of heat insulating material, e.g. asbestos, is disposed between the lower face of this flange and the corresponding shoulder in the piece 52. A further asbestos insulation 59 may be provided at the contact faces between the fitting 52 and the injector block 43.

In this way the nozzle piece 52 is heat insulated to a large degree from the hot block 43 and, moreover, when injection first takes place through the nipple 54, some of the plastic will flow up the horns 60 and the small cuplike gap between the nipple and the piece 52, forming further insulation between them. In addition a thin diaphragm of plastic which, as a result of the cooling of the part 52 through ducts 50 is left, after each injection, in the narrow gap between channels 60 and across the mouth of the orifice 56 prevents any dribble of plastic between injection strokes. This diaphragm is easily blown through at the next injection stroke, but has the secondary function of allowing of some build-up in pressure in the injection nozzle before this is done, thus ensuring an effective and uniform pressurising of the mould.

The injection piston is operated hydraulically from the equipment 7 which comprises, inter alia, a pump 62 continuously driven by a motor 63 and fed from an oil tank 61. The suction side of the pump is connected through a pipe 64 to a filter 65 in a filter compartment 66 of the tank, whilst at its delivery side it is connected through a pipe 67 with a restrictor valve 68 having an adjustable hand wheel 69 for varying the oil flow through a transfer pipe 70 leading to a main hydraulic control valve 71. This valve 71 has a spool which is solenoid-operated and is of the four-way type, i.e. so as to allow for changing over the direction of oil flow in pipes 72 and 73 respectively serving the upper and lower chambers of the injection cylinder 42. In so doing, it serves to change over the connections to the transfer pipe 70 and to an oil pipe 74 passing through an oil cooler 75 and leading from the latter as a discharge pipe 76 back into the oil reservoir 66. 77 and 78 respectively designate the inlets and outlet for cooling water to and from the cooler 75.

The arrangement therefore is that, on operation of the solenoid spool of valve 71, at appropriate times, the valve is switched over to allow for the pump 62 to supply oil through the pipes 67 and 70 (the latter at an appropriate pressure selected by adjustment of hand wheel 69), and thence through pipe 72 to the upper chamber of the injection cylinder 42, so producing an injection stroke of plunger 45. The scavenged oil passes through conduit 73, valve 71 and cooler 75 back to the reservoir 61. In contrast, when the solenoid is de-energised, the valve 71 is changed over to send oil to the lower chamber in cylinder 42, thereby retracting the injection plunger 45.

The solenoid of valve 71 is energised to produce the injection stroke, and de-energised to produce the retraction stroke, in timed relationship with the travel of the bolster, by means of a further cam 79 (see FIGURE 4) which is secured on the lower end of the main shaft 28 and cooperates with a microswitch 80 for this purpose.

In addition, it will be recalled that provision is made in this machine to omit moulds, when desired, from one or more of the mould zones in the bolster, and to ensure that no injection stroke occurs at any of these positions, a safety switch 81 is incorporated in the electrical circuit of the aforesaid solenoid and is operated at required times by a pin 82 to break the circuit and thus prevent an injection stroke. A pin 82 has actually been shown in FIGURE 1 of the drawings for explanatory purposes, but it will be appreciated that the pin would not actually be used in the situation illustrated in view of the presence of a mould 12, 13 at this location. The pin 82 is removable and can simply be inserted in a hole associated with each of the mould apertures.

At the moment of injection, the mould concerned has to be locked under a powerful sustaining force, and for this purpose the mould assembly is shifted as a whole against the injection nozzle 49. This is brought about mechanically by a toggle mechanism 83 which, at the required time, is straightened by means of a thrust arm 84 through an articulated link 85. The thrust of rod 84 and the straightening of the toggle mechanism is produced by a cam 88 (see FIGURE 3) which is also secured on the main shaft 28 and cooperates with a roller 89 upstanding from the arm 84, whilst the collapsing of the toggle is similarly affected by a further cam 86 on shaft 28 cooperating with another roller 87 on arm 84.

The upper levers (of which there is a side-by-side pack) of the toggle mechanism 83 are pivoted to a thrust block 90 carrying an arm 91 which bears against the lower end of the thrust plunger 8 carrying the respective lower mould part 13, whereby the mould is lifted as a whole against the injection nozzle 49 at the appropriate time determined by cam 88.

*Pre-Plasticizer Unit*

In this machine the plastic is pre-plasticized by passage through a unit 92 before being fed to the injection head. This unit is in three main parts, viz a cylindrical steel section 93 disposed with its axis horizontal, a feed section 94 at the plastic-inlet end, and a block 95 which is socketed into the side of the injector block 43. An axially-horizontal torpedo 96 is disposed in this tripartite unit and a plastic passageway 97 in the feed section 94 is flared at its inner end to receive the shaped end of the torpedo, this passageway being continued by an annular channel 98 around the torpedo and terminating in a series of ducts 99 which converge into a orifice 100 in the injection block 43 opening at right angles into the injection bore. Thus the pre-plasticised material is received directly in the bore of the injection plunger, and this bore, with the injection chamber 53, is cleared at every shot, so that the size of each shot can be accurately assessed.

To provide heat to assist pre-plasticising of the material, electrical heating elements 101 are wrapped around the cylinder 93 and further tubular heating resistances 102 pass into the torpedo 96 from the frame member 47. This arrangement enables the elements 102 to extend over the major part of the length of the torpedo, so as to give optimum internal heating of the latter, whilst allowing the elements to be readily inserted and removed during installation or for repair.

By the means described and the particular arrangement of the plastic flow channels, the plastic is uniformly heated and homogenised before it enters the injection chamber. The feed of plastic, by the means to be described below can, utilising this particular arrangement, be timed so as to build up pressure of plastic around the torpedo 96 whilst a previous shot is being injected, with the result that the plastic for the next shot is immediately available in hot, pre-plasticised condition for the next injection, and the successive injections therefore performed at a relatively high rate. A further advantage is that, under these circumstances, the injection orifice(s) in the mould can be made small and thus scars eliminated from the moulded product.

*Feed Assembly*

The feed of the plastic into the passageway 97 is performed by the feed assembly 9 which comprises a granule hopper 103 mounted on a bracket 104 of a supporting frame (of which only a member 110 is seen) carried by the aforementioned uprights on the bedplate. This bracket is also used to support a fixed distributing cylinder 105 into which the hopper opens, and to slidably mount (by means of a collar 106) a stuffing device 107. This latter is reciprocable from the main shaft 28 (as will be described below), so that a plunger 108 thereof advances plastic, brought into the path thereof from cylinder 105 through a chute 109, into the passageway 97.

To implement this arrangement, the shaft 28 is also provided (see FIGURE 1) with a crank portion 111, of which the connecting rod 112 is articulated through a coupling 113 to a horizontal, axially-reciprocable rod 114 provided with a rack 115 at its opposite end. Rack 115 cooperates with a correspondingly toothed gear wheel on a vertical shaft 116 which is provided with a similar gear which at its upper end meshes with a rack 117 on a horizontal stub shaft 118 mounted in a fixed bearing 119 and forming part of the feed assembly. This shaft 118 is enlarged at 120 and provided with a piston head 121 which is received in a cylinder 122 closed at its opposite end by a plate 123 which is recessed to receive a head on the plunger 108.

This plunger 108 is fastened to plate 123 by means of a further plate 124 which is bifurcated at its upper end and has attached thereto by links 125, one only of which is seen in FIGURE 1 at the rear side of the assembly 9, for operating a metering pusher 126. This pusher, it will be observed, has a screw threaded stem 127 connected to the links 125 so that, in response to the reciprocation of the stub shaft 118 by the rotation of main shaft 28 through the crank and rack arrangement described above, the distributing pusher 126 is also advanced to forward a quantity of solid plastic from the hopper 103 through the cylinder 105 into the duct 109. The effective stroke of this pusher can be adjusted by screwing the stem 127 relatively to links 125. Thus, each forward stroke of feed plunger 108 is accompanied by a corresponding forwarding of a fresh, metered charge to the duct 109 to be available to the feed plunger 108 at the next stroke.

In this connection it will be observed that the pusher 126 has a rod 128 of smaller diameter at its leading end, this having the function of loosening and breaking up the plastic material, so as to avoid any blockage in the feed.

It is also to be observed that the plate 123 is provided with a connection 129 to a convenient hydraulic pressure source, whereby the chamber in cylinder 122 is normally under a hydraulic pressure so that the stuffing device 107 normally moves as a solid unit in its stuffing operation but, in the event that this plunger should meet excessive resistance in its forward travel, for example due to the fact that the solid plastic has not yet been softened sufficiently in the feed passageway 97 or the injection plunger 45 has not been operated or has stuck, the hydraulic cushion in cylinder 122 can yield to allow the piston 121 to travel relatively to its cylinder and the unit 107 thereby to telescope.

*Mould Details and Operation*

The upper part 12 and the lower part 13 of each mould assembly, in the particular arrangement chosen for illustration, respectively represent a mould cavity and a mould core, and are so constructed and arranged so that they can not only be parted for stripping of the moulded article therefrom, but can also, in this machine, be used to automatically break the sprue resulting from the injection.

Figure 5:
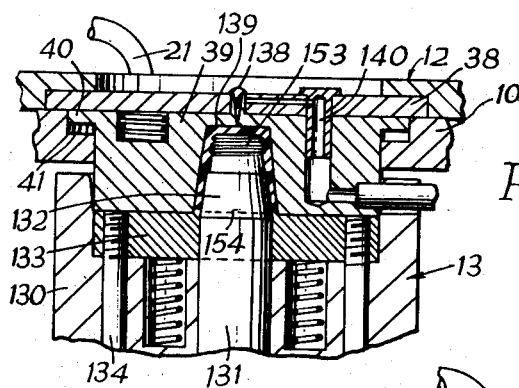
FIGURES 5 and 6 are diagrammatic detail sections illustrating the operation of moulds employed in this machine.
Figure 6:
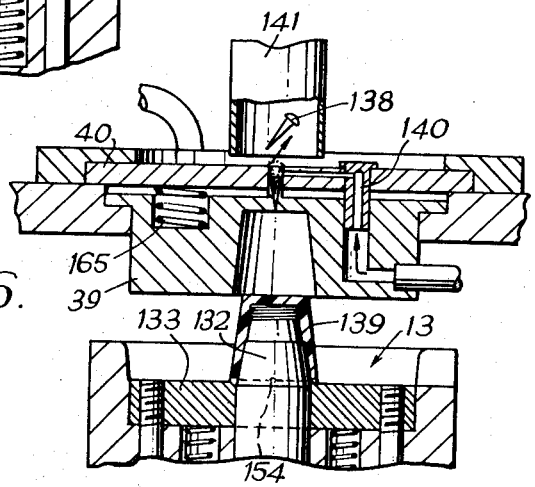

The upper part 12 of each mould is, in fact, itself made up of two parts which are capable of limited axial separation, viz a disc 38 which rests on the surface of the upper bolster plate 10, and a cavitied die plate 39 which is accommodated in the mould aperture of the bolster plate 10 and has a collar 40 which is received with axial play in a recess 41 in the bolster around the aforesaid aperture (see FIGURES 5 and 6). Spring means, such as illustrated at 165 in these figures urges plate 39 towards mould part 13 and thus maintains pressure between the mould parts during the cooling period of the mould.

The lower mould part 13 is made up of several components, viz a main cylindrical body 130 centrally bored to rotatably receive a stem 131 (see FIGURE 4) which is tapered at its upper end 132 to form the moulding core proper. Disposed around the upper end of stem 131 is a collar 133 to which are secured knock-out rods 134 which are slidable in, and depend from, the lower side of the lower mould part 13.

As indicated above, each of the lower mould parts 13 has a depending thrust plunger 8, and it is to be further noted that each of these has at is lower end a lateral arm 135 carrying a roller 136 which runs on a circular rail track 137 co-axial with the bolster of the machine and disposed beneath the lower plate of the latter. This track 137 controls the opening and closing of the moulds at appropriate stations and is so disposed that, over the stations A, B, C, D and E, it is of the full height shown at the right hand side of FIGURE 4, i.e. closes the mould completely as illustrated in FIGURE 5, with the component 40 of the upper part lifted clear of its supporting shoulder 41 in the bolster plate.

As has been indicated above, the straightening of toggle mechanism 83 at injection station A lifts the complete mould assembly against the injector nozzle, i.e. the roller 136 then leaves the track 137. Apart from this, and the conditions at the stripping station (to be described below), the roller remains on, and in contact with, the track 137. From stations B to E this means that the mould continues closed as seen in FIGURE 5, but on reaching station F, where the track 137 is stepped down (see FIGURE 4), the mould is caused to open as illustrated in FIGURE 6.

A first result is the descent of mould component 39 away from its companion disc 40, and this is utilised to break off sprue, designated 138, from the moulded article 139. Moreover, the injection orifice in the head 5 is devised so as to leave this sprue 138 with a small head as shown in FIGURES 5 and 6, and it will be observed that a compressed air conduit 140 is provided in the components 39 and 40 of the upper mould part, and opens into the tapered gate channel in disc 38, just below this head on the sprue. Thus, when the mould is opened at the station F, the air blow through 140 comes into operation, being for instance released by an air valve operated by another cam (not shown) on camshaft 28, to discharge the sprue, now broken off, into a pipe 141 located immediately above it at this station. This pipe (see FIGURE 1) communicates directly with the chute 109 in the plastic feed system of the apparatus, whereby the sprue is automatically returned into the plastic supply and, being small, can be directly replasticised and used again.

At the stripping station G, the track 137 is interrupted to allow the lower mould half 13 to be taken down further (see FIGURE 4) for automatic ejection of the moulded article 139, as a result of the knock-out rods 134 then abutting the bolster plate 11 or a bush 135 in which the stem 8 moves. As will be seen in FIGURE 4, the moulded article 139 is simply lifted with the collar 133 clear of the rest of the lower mould part at this stage. The descent of the stem 8 at station G is brought about by a pull down plate 142 which is arranged to engage the corresponding roller 136 from the upper side. This plate 142 is operable by the action, on a vertical shaft 164 carrying the same and positioned to receive and support the roller 136 from below, of gear wheel 143 on a shaft 144 which is itself rotatable through further gearing from a vertical rack bar 145 disposed beside the main shaft 28. This rack bar 145 has a follower roller 146 running in a cam groove 147 in a block 148 keyed to the main shaft 28, this cam groove 147 being designed so that the pulldown plate descends at the required time with the lower mould part 13.

The machine described is, furthermore, provided with means for detaching from the mould articles which have been moulded with a screw thread. For this purpose, each of the mould stems 8 has mounted therein a rotatable unscrewing mandrel 149 which, at its upper end, has a nib 150 engaging in a corresponding slot in the stem 131. The mandrel 149 is provided at its lower end with clutch teeth 151 which are intended, when the mould assembly reaches station F, to engage with corresponding teeth on a permanently driven spindle 152, thereby to rotate mandrel 149, the stem 131 and the mould core 132.

In FIGURES 5 and 6 it has been assumed that this core is formed at 153 to produce a screw thread in a moulded cap 139, so that the consequent rotation of this core 132 at station F, the mould being open, will cause the cap 139 to rise off the mould and simply remain carried by the collar 133. To allow for this relative rotation between cap 139 and core 132, it will be noted that the collar 133 is provided around the latter with small pips 154.

The rotary drive to spindle 152 is, in this machine, taken off the shaft 37 forming part of the drive transmission to the main operating shaft 28. Referring particularly to FIGURE 3, it will be noted that this shaft is extended through the gear box 34 and at its outer end is coupled through a train of gears 155 to a shaft 156 carrying a worm 157 which is in mesh with a worm wheel 158 splined on the spindle 152. As will therefore be appreciated, this spindle is continuously rotated from the main driving motor 6 and will therefore rotate the mandrel 149 as soon as it is coupled up through teeth 151.

An axial upward movement is imparted to spindle 152, to effect the coupling at required times, by means of a rocking lever 159 which has a fork 160 engaging in a grooved sleeve 161 secured to spindle 152. The required upward movement is provided by a tension spring 162 which urges the tail of rocking lever 159 downwards, but is opposed by a pin 163 carried by the shaft 164.

As will therefore be appreciated, when a mould part 13 is being lowered to its bottom position as station G, the pin 163 participating in this descent of the mould part will release lever 159, so that the spindle 152 is pushed up to automatically engage and rotate the mandrel 149 of the next following mould, now at station F. In this way the threaded article is automatically unscrewed at station F ready for clearance from its core at station G, when it can be knocked off or blown into a suitable collector.

As will be appreciated the machine may function without making use of the unscrewing mandrel, and this can be catered for simply by removing the gear 155′ (see FIGURE 3) on the end of shaft 37.

The machine described is found to be very efficient in operation and to secure the various advantages which have been enumerated in the above specification. Additionally, however, it is pointed out that the running costs are low, but the machine of fast output because the operation is primarily mechanical, except for the hydraulic device for performing the actual injection stroke, and this does not require to be powerful because the plastic is already pre-plasticised before it is moved by the injection plunger. This plunger does not have to travel any substantial distance and there is a further saving here and, particularly, a high rate of injection allowed for.

Moreover, the mechanical mould operation described allows injection to be carried out under a considerable pressure so that large articles can be produced (for example two ounces in weight) in a relatively small machine.

Again, the arrangement allowing the use of some moulding zones only has the very great advantage that production can, say, be commenced when only one mould is available, and stepped up as other moulds become ready. Further, where the demand for particular forms of article are not so high, the machine can still be used to produce a smaller number and, again, different forms of article can be produced on the same machine.

I claim:

1. In an injection moulding machine of the turret type including a frame, a bolster mounted on said frame and rotatable through successive stations, means for indexing said bolster to said stations in turn, a plurality of molds carried by said bolster, each said mold comprising an upper cavity part and lower threaded core part separable from said upper cavity part, the improvement consisting in said lower core part being coupled to a mandrel rotatable in a thrust plunger vertically movable in the bolster, a fixed trackway beneath said bolster supporting said thrust plungers, said trackway being stepped along part of its length corresponding to a mold opening station to permit said thrust plunger at said station to pass downwardly and carry said core part away from said upper cavity portion of said mold at said station, a continuously driven spindle vertically shiftable on said frame at said mold opening station and positioned in alignment with said mandrel, and means for raising said spindle into driving engagement with said mandrel, whilst said core portion is in lowered position, for rotating said core part.

2. In an injection moulding machine of the turret type including a frame, a bolster mounted on said frame and rotatable through successive stations, means for indexing said bolster to said stations in turn, a plurality of molds carried by said bolster, each said mold comprising an upper cavity part and a lower threaded core part separable from said upper cavity part, the improvement consisting in said lower core part being coupled to a mandrel rotatable in a thrust plunger vertically movable in the bolster, a fixed trackway beneath said bolster supporting said thrust plungers, said trackway being stepped and interrupted along part of its length, said stepping corresponding to a mold opening station to permit said thrust plunger at said station to pass downwardly and carry said core part away from said upper cavity portion of said mold at the mold-opening station, a continuously driven spindle vertically shiftable on said frame at said mold-opening station and positioned in alignment with said mandrel, vertically reciprocable pull-down means positioned on said frame in alignment with said interruption of said trackway at a subsequent molding-stripping station of said bolster to engage with said thrust plunger at said molding-stripping station, spring-loading on said frame and acting between said frame and said vertically shiftable spindle to urge said spindle upwardly into engagement with said mandrel at said mold-opening station, and linkage on said frame coupling said pull-down means and said vertically-shiftable spindle such that downward movement of said pull-down means releases said vertically-shiftable spindle for upward movement under said spring-loading.

3. In an injection moulding machine of the turret type including a frame, a bolster mounted on said frame and rotatable through successive stations, means for indexing said bolster to said stations in turn, a plurality of molds carried by said bolster, each said mold comprising an upper cavity part and a lower threaded core part separable from said upper cavity part, the improvement consisting in said lower core part being coupled to a mandrel rotatable in a thrust plunger vertically movable in said bolster, a roller on each said thrust plunger, a fixed trackway beneath said bolster supporting said rollers of said thrust plungers, said trackway being stepped and interrupted along part of its length, said stepping corresponding to a mold-opening station to permit said thrust plunger at said station to pass downwardly and carry said core part away from said upper cavity portion of said mold at said mold-opening station, a continuously driven spindle vertically shiftable on the said frame at said mold opening station and positioned in alignment with said mandrel, a vertically reciprocated pull-down shaft positioned on said frame in alignment with said interruption of said track at a subsequent molding-stripping station of said bolster, a plate on said pull-down shaft to engage on said roller of said thrust plunger at said molding-stripping station to pull said plunger downwardly, a spring-loaded lever pivoted on said frame and coupled at one end to said vertically shiftable spindle for urging said spindle upwardly into engagement with said mandrel at said mold-opening station, and means carried by said pull-down shaft engaging the other end of said lever when said pull-down shaft is in raised position, whereby downward movement of said pull-down shaft releases said lever to move under its spring-loading and move said vertically-shiftable spindle upwardly.

References Cited in the file of this patent

UNITED STATES PATENTS

| | | |
|---|---|---|
| 2,155,316 | Lauterbach | Apr. 18, 1939 |
| 2,333,056 | Thoreson et al. | Oct. 26, 1943 |
| 2,351,774 | McGowen | June 20, 1944 |
| 2,526,797 | Ashbaugh | Oct. 24, 1950 |
| 2,719,326 | Dykehouse | Oct. 4, 1955 |
| 2,748,424 | Fay | June 5, 1956 |
| 2,799,049 | Wilson | July 16, 1957 |
| 2,828,508 | Labarre | Apr. 1, 1958 |
| 2,831,214 | Eyles | Apr. 22, 1958 |
| 2,834,992 | Jupa | May 20, 1958 |
| 2,838,801 | Delong | June 17, 1958 |
| 2,862,240 | Strauss | Dec. 2, 1958 |
| 2,866,230 | Holte | Dec. 30, 1958 |
| 2,879,545 | Bailey | Mar. 31, 1959 |
| 2,928,125 | Smucker | Mar. 15, 1960 |
| 2,984,862 | Chabotte | May 23, 1961 |
| 3,008,181 | Fitz | Nov. 14, 1961 |
| 3,005,235 | Patera | Oct. 24, 1961 |

FOREIGN PATENTS

| | | |
|---|---|---|
| 1,157,237 | France | May 28, 1958 |